Oct. 27, 1970 SUSUMU FUKUDA 3,536,277
FILM MAGAZINE FOR MOTION PICTURE PROJECTOR
Filed Aug. 22, 1967
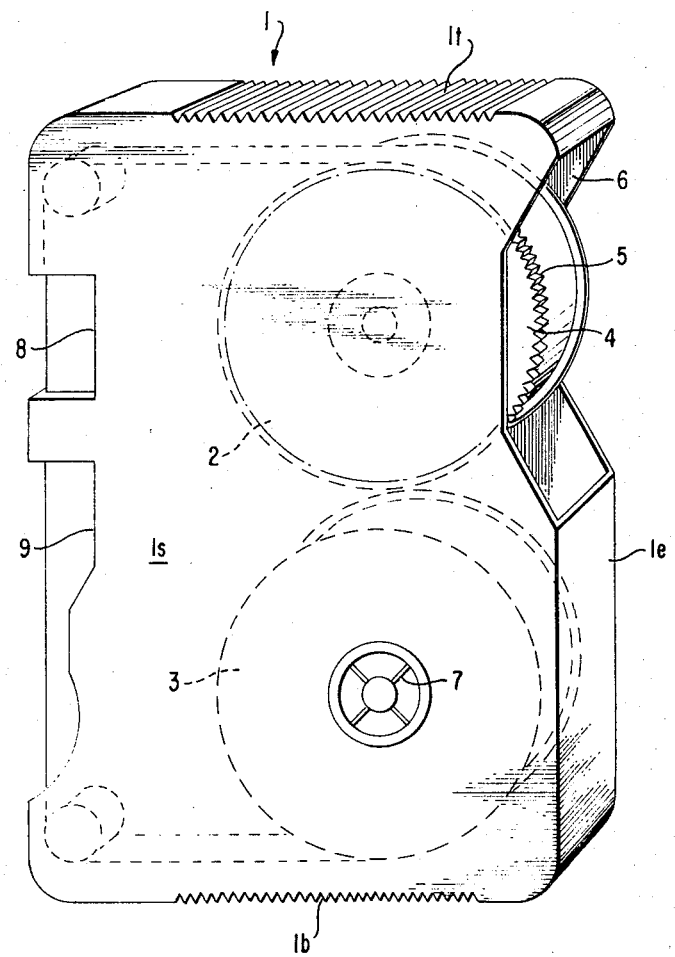
INVENTOR
SUSUMU FUKUDA
BY Sughrue, Rothwell, Mion, Zinn & Macpeak
ATTORNEYS

United States Patent Office 3,536,277
Patented Oct. 27, 1970

3,536,277
FILM MAGAZINE FOR MOTION PICTURE PROJECTOR
Susumu Fukuda, Nishinomiya-shi, Japan, assignor to Fuji Shashin Film Kabushiki Kaisha, Ashigara-Kamigun, Kanagawa, Japan
Filed Aug. 22, 1967, Ser. No. 662,351
Claims priority, application Japan, Aug. 30, 1966, 41/57,143
Int. Cl. G03b 1/04
U.S. Cl. 242—199                      1 Claim

ABSTRACT OF THE DISCLOSURE

A film magazine usable for motion picture film to be projected includes a box like magazine housing rotatably supporting supply and take-up reels therein. One side wall of the housing is removed for access to the film for projection and the other side wall of the housing is removed for access to the periphery of the supply reel, so that the supply reel may be engaged by a rotatable rewinding roller. The magazine also includes knurled portions on the periphery of the supply reel for rewinding and on the top and bottom of the magazine housing for moving the magazine bodily into and out of projection position.

BACKGROUND OF INVENTION

This invention relates to improvements in magazines for movie film particularly of the type wherein a magazine housing rotatably supports a supply reel and a take-up reel therein.

It is known in the art to provide a film magazine for a movie film. However, problems are encountered in rewinding the film. This invention provides a magazine housing having one end wall removed for access to a film supply reel and has knurled edges on the film supply reel so that the film supply reel can be engaged by a friction and the film rewound quickly and easily.

DESCRIPTION OF DRAWING

The single figure is a perspective view of the magazine for motion picture film of this invention.

DESCRIPTION OF PREFERRED EMBODIMENT

Referring to the drawing, the film magazine is particularly adapted to use in a motion picture projector of the type shown in an application entitled "Automatic Magazine Changing Type Projector With Automatic Rewinding Means," filed concurrently herewith, Ser. No. 662,377.

The magazine of this invention includes a box like housing 1 which rotatably supports therein a film supply reel 2 and a film take-up reel 3. As can be seen the supply reel 2 is mounted in the upper portion of the housing and the take-up reel 3 is mounted in the lower part of the housing.

As can be seen, the housing includes a pair of side walls 1s, a pair of end walls 1e, a top wall 1t, and a bottom wall 1b. A portion of one end wall 1e is removed to provide an opening 6 which exposes the peripheral flanges 4 of the supply reel 2. On the periphery of flanges 4 knurled edges 5 are provided. These edges provide a frictional connection with a friction roller in the projector to facilitate rewinding.

The take-up reel 3 is rotatably mounted and has an extension 7 of its support shaft extending through the side wall 1s of housing 1 so that it may be engaged with a slip clutch drive of a projector to drive reel 3 and cause the film to unwind from reel 2 during the projection operation.

Additional openings 8 and 9 are provided in the other end wall in order to expose the film to the projection system which, of course, includes an optical system, gating sprocket and if required, recording and reproducing mechanism for sound track on the film.

Surfaces 1t and 1b on the housing top and bottom walls may be knurled for cooperating with friction rollers or formed as a rack to cooperate with pinion gears to move the magazine bodily into and out of projection position.

The magazine of this invention may be loaded into a projector, such as that described in the aforesaid application, and the extension 7 engaged by a slip clutch drive on the projector. The movie film will then be wound onto the tape-up reel 3 from the supply reel 2 during the projection. After the film on supply reel 2 has completed its travel past the projection system and it is desired to rewind the film in the magazine, a friction roller carried by the projector is moved into contact with the knurled edge 5 of flange 4 of supply reel 2 and rotated to rewind the film from the take-up spool 3 to the film supply spool 2. The friction roller is driven by the projector and rotates the supply reel 2 by its frictional engagement with knurled edge 5. The leading and trailing edges of the film are secured to the take-up and supply reels, respectively. The drive to protrusion 7 is through a slip clutch and the frictional connection to the drive of knurled edge 5 will also slip so that the ends of the film may be positively secured to the respective spools and when the film is wound from one spool to another the end of the film will not be detached from the empty spool. Accordingly, the film may be quickly rewound and thereafter be in condition for repeated showings.

With the film magazine of this invention, when rewinding is accomplished by means of knurling 5 on the flange 4 of the film supply reel 2 cooperating with friction rollers, there may be several film magazines positioned side by side for simultaneous rewinding by friction rollers on the same shaft of the projection machine, see the aforesaid copending application. In the case of projecting successive magazines, it is highly effective to accomplish the rewinding operation at one time for all of the magazines, in order to eliminate loss time and not have to rewind each magazine after the film therein is projected.

In the present invention, the knurled edges eliminate a requirement for precice accuracy between the contact of the periphery of the flanges 4 of the supply reel 2 and a cooperating friction roller. This is particularly effective as it allows the magazines of this invention to be employed in a motion picture projector capable of projecting successive magazine films without rewinding.

What is claimed is:
1. A film magazine for motion picture film and for use in a motion picture projector, the magazine comprising: a box like magazine housing having side walls, end walls, and top and bottom walls, a portion of one end wall removed for access to the film and a portion of the other end wall removed, film supply and take-up reels disposed within and rotatably mounted in the magazine between the side walls, the take-up reel mounted on a shaft extend- ing to the outside of the casing and adapted to be driven by the projector, the supply reel having its peripheral flanges exposed through the removed portion of the other end wall, a knurled friction engaging surface on the periphery of the flanges of the supply reel adapted to engage a friction drive roller for rewinding the film and a friction increasing surface configuration in the housing top and bottom walls for cooperating with a drive member to move the magazine bodily.

References Cited

UNITED STATES PATENTS

| | | | |
|---|---|---|---|
| 2,275,497 | 3/1942 | Berndt | 242—200 |
| 2,804,508 | 8/1957 | Mastling et al. | 242—199 X |
| 3,177,768 | 4/1965 | Hallamore | 242—71.2 X |
| 3,201,817 | 8/1965 | Atchley | 242—71.2 X |

NATHAN L. MINTZ, Primary Examiner